United States Patent
Frantz et al.

(10) Patent No.: US 12,236,188 B2
(45) Date of Patent: Feb. 25, 2025

(54) RESOLVING LIVE EDIT CONFLICTS

(71) Applicant: SIGMA COMPUTING, INC., San Francisco, CA (US)

(72) Inventors: Jason D. Frantz, San Francisco, CA (US); Neil F. Lugovoy, Los Gatos, CA (US); Christopher Messer, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 18/069,757

(22) Filed: Dec. 21, 2022

(65) Prior Publication Data
US 2024/0111949 A1 Apr. 4, 2024

Related U.S. Application Data

(63) Continuation-in-part of application No. 17/715,718, filed on Apr. 7, 2022.

(51) Int. Cl.
G06F 40/197 (2020.01)
G06F 40/18 (2020.01)

(52) U.S. Cl.
CPC .......... G06F 40/197 (2020.01); G06F 40/18 (2020.01)

(58) Field of Classification Search
CPC ...... G06F 40/197; G06F 40/18; G06F 40/194; H04L 67/10
See application file for complete search history.

(56) References Cited

U.S. PATENT DOCUMENTS

| | | | |
|---|---|---|---|
| 7,496,841 B2 | 2/2009 | Hadfield et al. | |
| 7,756,824 B2 | 7/2010 | Campbell et al. | |
| 7,769,810 B1 | 8/2010 | Kaufman | |
| 7,933,952 B2 | 4/2011 | Parker et al. | |
| 8,453,052 B1 * | 5/2013 | Newman .............. | G06Q 10/101 715/255 |

(Continued)

FOREIGN PATENT DOCUMENTS

| | | | |
|---|---|---|---|
| CN | 101527837 A | * | 9/2009 |
| EP | 3230894 B1 | | 11/2021 |

(Continued)

OTHER PUBLICATIONS

Preston Gralla, How to use Excel's new live collaboration features, retrieved from—https://www.computerworld.com/article/3212262/how-to-use-excel-live-collaboration.html, Aug. 1, 2017, 9 pages (Year: 2017).*

(Continued)

*Primary Examiner* — Yongjia Pan

(57) ABSTRACT

Live editing a workbook with multiple clients including receiving, by a workbook manager from a first workbook client, a first workbook patch comprising a base version ID and a first workbook edit; determining, by the workbook manager, that the base version ID from the first workbook patch matches the version ID for a confirmed workbook on the workbook manager; applying, by the workbook manager, the first workbook edit to the confirmed workbook on the workbook manager; advancing, by the workbook manager, the version ID for the confirmed workbook; and sending, by the workbook manager, an acknowledgement of the first workbook patch to the first workbook client.

18 Claims, 9 Drawing Sheets

(56) References Cited

U.S. PATENT DOCUMENTS

| | | |
|---|---|---|
| 8,453,112 B1 | 5/2013 | Brambley et al. |
| 8,516,050 B1 | 8/2013 | Chapweske et al. |
| 8,612,380 B2 | 12/2013 | Kleppner et al. |
| 8,738,706 B1 * | 5/2014 | Grieve ................. G06Q 10/101 |
| | | 709/219 |
| 9,092,413 B1 | 7/2015 | Ho et al. |
| 9,367,530 B2 | 6/2016 | Antebi et al. |
| 9,396,279 B1 | 7/2016 | O'Donnell |
| 9,785,693 B2 * | 10/2017 | Kapadia ............... G06Q 10/101 |
| 10,169,401 B1 | 1/2019 | Ho et al. |
| 10,503,822 B1 | 12/2019 | Spencer et al. |
| 10,606,576 B1 | 3/2020 | Tung et al. |
| 10,721,084 B2 | 7/2020 | Simonyi et al. |
| 10,740,551 B2 | 8/2020 | Rochelle et al. |
| 10,872,062 B2 | 12/2020 | Truong et al. |
| 10,887,357 B2 | 1/2021 | Hardee et al. |
| 10,902,185 B1 * | 1/2021 | Cairns ................... G06F 40/166 |
| 10,970,457 B2 | 4/2021 | Prakash et al. |
| 11,023,445 B2 * | 6/2021 | Bestfleisch ............. G06F 16/80 |
| 11,755,825 B2 | 9/2023 | Smith et al. |
| 2002/0065848 A1 | 5/2002 | Walker et al. |
| 2004/0205653 A1 | 10/2004 | Hadfield et al. |
| 2006/0195532 A1 | 8/2006 | Zlateff et al. |
| 2008/0059539 A1 | 3/2008 | Chin et al. |
| 2009/0157811 A1 | 6/2009 | Bailor et al. |
| 2009/0271696 A1 * | 10/2009 | Bailor ................... G06F 16/954 |
| | | 715/229 |
| 2009/0327358 A1 * | 12/2009 | Lukiyanov .............. G06F 16/48 |
| | | 707/999.203 |
| 2010/0083136 A1 | 4/2010 | Komine et al. |
| 2010/0169269 A1 | 7/2010 | Chandrasekaran |
| 2010/0318922 A1 * | 12/2010 | Strathearn ............. G06F 16/345 |
| | | 715/751 |
| 2011/0078246 A1 | 3/2011 | Dittmer-Roche |
| 2012/0110445 A1 | 5/2012 | Greenspan et al. |
| 2012/0192055 A1 | 7/2012 | Antebi et al. |
| 2012/0233137 A1 | 9/2012 | Jakobson et al. |
| 2013/0155071 A1 | 6/2013 | Chan et al. |
| 2013/0226876 A1 | 8/2013 | Gati et al. |
| 2013/0326323 A1 | 12/2013 | Siwoff et al. |
| 2013/0326330 A1 | 12/2013 | Harris et al. |
| 2014/0101310 A1 | 4/2014 | Savage et al. |
| 2014/0195899 A1 | 7/2014 | Bastide et al. |
| 2014/0245015 A1 | 8/2014 | Velamoor et al. |
| 2015/0113390 A1 * | 4/2015 | Vagell ................... G06F 40/106 |
| | | 715/255 |
| 2015/0193406 A1 | 7/2015 | Lemonik et al. |
| 2015/0378972 A1 | 12/2015 | Kapadia et al. |
| 2016/0048486 A1 | 2/2016 | Lopategui |
| 2016/0162461 A1 | 6/2016 | Simon et al. |
| 2016/0378737 A1 | 12/2016 | Keslin et al. |
| 2017/0149906 A1 | 5/2017 | DeMaris et al. |
| 2017/0357646 A1 | 12/2017 | Ayyar et al. |
| 2018/0189369 A1 | 7/2018 | Baek et al. |
| 2018/0196788 A1 | 7/2018 | Grigorovitch et al. |
| 2018/0365263 A1 | 12/2018 | Mohan et al. |
| 2019/0065526 A1 | 2/2019 | Ribeiro et al. |
| 2019/0129973 A1 | 5/2019 | Truong et al. |
| 2019/0138588 A1 | 5/2019 | Silk et al. |
| 2019/0147402 A1 | 5/2019 | Sitrick et al. |
| 2019/0250780 A1 | 8/2019 | Feng et al. |
| 2020/0034438 A1 * | 1/2020 | Bestfleisch ............. G06F 16/34 |
| 2021/0081605 A1 | 3/2021 | Smith et al. |
| 2021/0133253 A1 | 5/2021 | Underwood et al. |
| 2021/0216704 A1 | 7/2021 | Peterson et al. |
| 2021/0234908 A1 * | 7/2021 | Wallhult ............... H04L 63/102 |
| 2022/0222625 A1 | 7/2022 | Haramati et al. |
| 2022/0237371 A1 | 7/2022 | Simon et al. |
| 2023/0055241 A1 | 2/2023 | Zionpour et al. |

FOREIGN PATENT DOCUMENTS

| | | |
|---|---|---|
| WO | WO2002027434 A2 * | 4/2002 |
| WO | 2009055531 A2 | 4/2009 |
| WO | 2022153122 A1 | 7/2022 |

OTHER PUBLICATIONS

Gralla, Preston, "How to use Excel's new live collaboration features", Aug. 1, 2017, retrieved from—https://www.computerworld.com/article/3212262/how-to-use-excel-live-collaboration.html, 10 pages, 2017.

Annonymous, "Google Sheets Connector by Fivetran," retrieved from—https://console.cloud.google.com/marketplace/product/fivetran-bq-dts/google-sheets, dated Apr. 3, 2021, 2 pages.

Heller, "How to choose a cloud data warehouse", https://www.infoworld.com/article/3640540/how-to-choose-a-cloud-data-warehouse.html, dated Dec. 13, 2021, 11 pages.

International Search Report and Written Opinion, PCT/US2023/085269, Apr. 16, 2024, 9 pages.

* cited by examiner

RESOLVING LIVE EDIT CONFLICTS

BACKGROUND

Field of the Invention

The field of the invention is data processing, or, more specifically, methods, apparatus, and products for live editing a workbook with multiple clients.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for live editing a workbook with multiple clients including receiving, by a workbook manager from a first workbook client, a first workbook patch comprising a base version ID and a first workbook edit; determining, by the workbook manager, that the base version ID from the first workbook patch matches the version ID for a confirmed workbook on the workbook manager; applying, by the workbook manager, the first workbook edit to the confirmed workbook on the workbook manager; advancing, by the workbook manager, the version ID for the confirmed workbook; and sending, by the workbook manager, an acknowledgement of the first workbook patch to the first workbook client.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
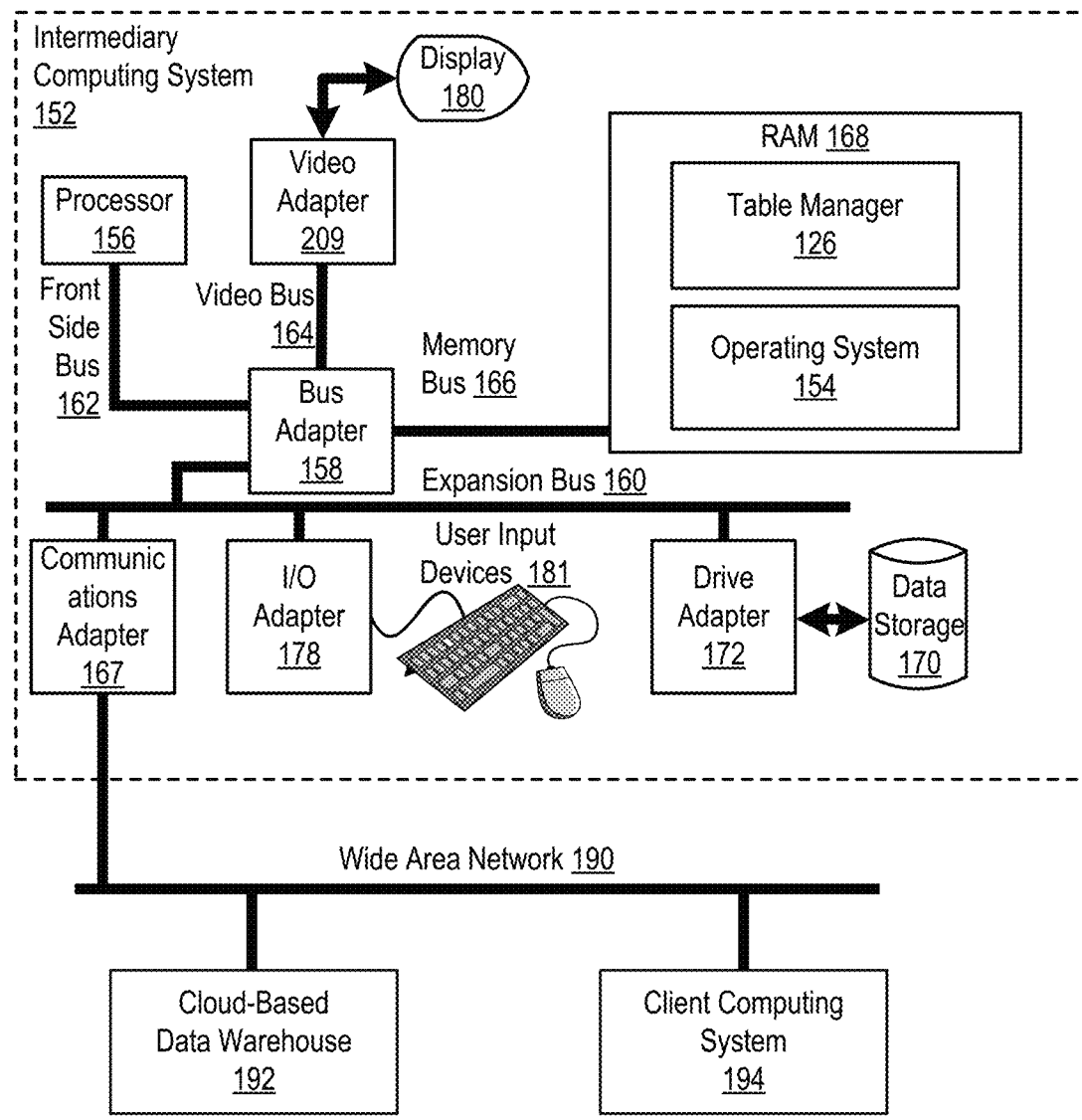
FIG. 1 sets forth a block diagram of an example system configured for live editing a workbook with multiple clients according to embodiments of the present invention.

Exemplary methods, apparatus, and products for live editing a workbook with multiple clients in accordance with the present invention are described with reference to the accompanying drawings, beginning with FIG. 1. FIG. 1 sets forth a block diagram of automated computing machinery comprising an exemplary intermediary computing system 152 configured for live editing a workbook with multiple clients according to embodiments of the present invention. The intermediary computing system 152 of FIG. 1 includes at least one computer processor 156 or 'CPU' as well as random access memory 168 ('RAM') which is connected through a high speed memory bus 166 and bus adapter 158 to processor 156 and to other components of the intermediary computing system 152.

Stored in RAM 168 is an operating system 154. Operating systems useful in computers configured for live editing a workbook with multiple clients according to embodiments of the present invention include UNIX™, Linux™, Microsoft Windows™, AIX™, and others as will occur to those of skill in the art. The operating system 154 in the example of FIG. 1 is shown in RAM 168, but many components of such software typically are stored in non-volatile memory also, such as, for example, on data storage 170, such as a disk drive. Also stored in RAM is the table manager 126, a module for live editing a workbook with multiple clients according to embodiments of the present invention.

The intermediary computing system 152 of FIG. 1 includes disk drive adapter 172 coupled through expansion bus 160 and bus adapter 158 to processor 156 and other components of the intermediary computing system 152. Disk drive adapter 172 connects non-volatile data storage to the intermediary computing system 152 in the form of data storage 170. Disk drive adapters useful in computers configured for live editing a workbook with multiple clients according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example intermediary computing system 152 of FIG. 1 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example intermediary computing system 152 of FIG. 1 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The exemplary intermediary computing system 152 of FIG. 1 includes a communications adapter 167 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for live editing a workbook with multiple clients according to embodiments of the present invention include modems for wired dial-up communications, Ethernet (IEEE 802.3) adapters for wired data communications, and 802.11 adapters for wireless data communications.

The communications adapter 167 is communicatively coupled to a wide area network 190 that also includes a cloud-based data warehouse 192 and a client computing system 194. The cloud-based data warehouse 192 is a computing system or group of computing systems that hosts a database or databases for access over the wide area network 190. The client computing system 194 is a computing system that accesses the database using the table manager 126.

Figure 2:
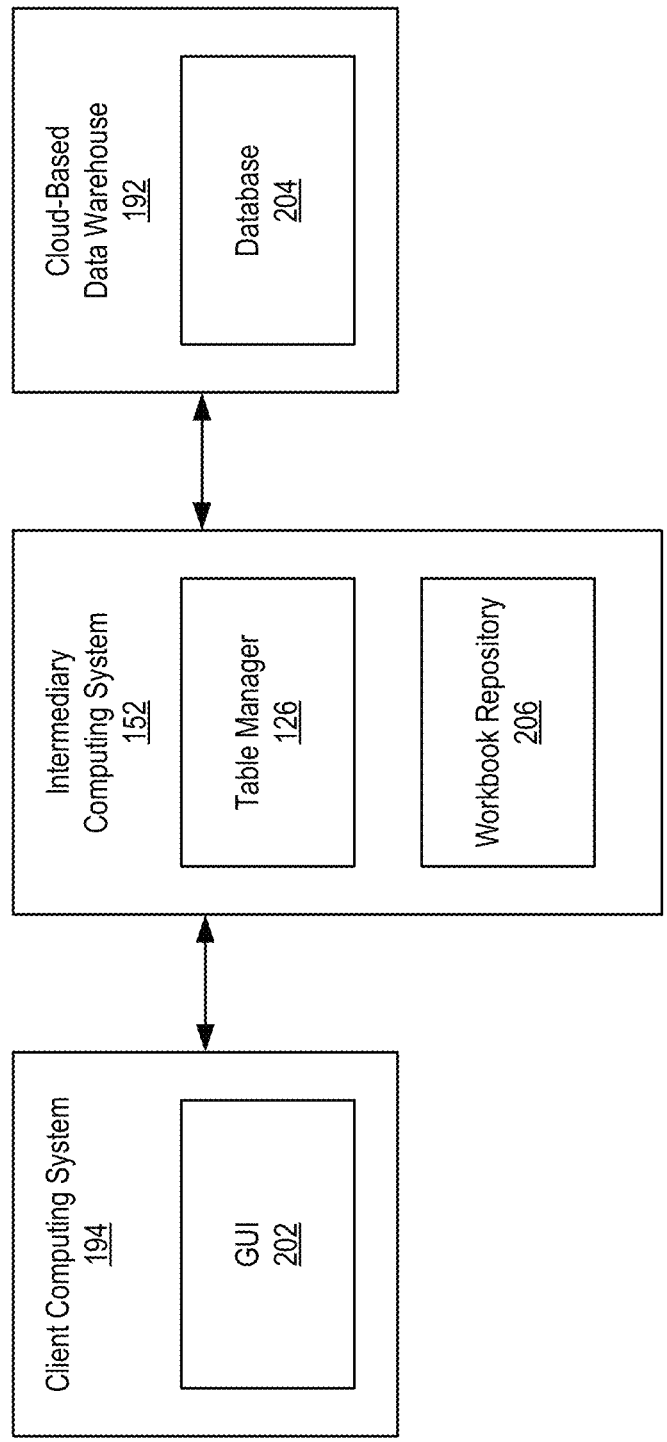
FIG. 2 sets forth a block diagram of an example system configured for live editing a workbook with multiple clients according to embodiments of the present invention.

FIG. 2 shows an exemplary system for live editing a workbook with multiple clients according to embodiments of the present invention. As shown in FIG. 2, the system includes a client computing system 194, an intermediary computing system 152, and a cloud-based data warehouse 192. The client computing system 194 includes a graphical user interface (GUI) 202. The intermediary computing system 152 includes a table manager 126 and a workbook repository 206. The cloud-based data warehouse 192 includes a database 204. The client computing system 194 may access the cloud-based data warehouse 192 and database 204 via the table manager on the intermediary computing system 152.

The GUI 202 is a visual presentation configured to present data sets in the form of workbooks to a user. The GUI 202 also receives requests from a user for data sets from the database 204. The GUI 202 may also present to the user the ability to add a new row into a data set or table and enter values for each column of the new row. The GUI 202 may be presented, in part, by the table manager 126 and displayed on a client computing system 194 (e.g., on a system display or mobile touchscreen). The GUI 202 may be part of an Internet application that includes the table manager 126 and is hosted on the intermediary computing system 152.

The database 204 is a collection of data and a management system for the data. A data set is a collection of data (such as a table) from the database 204. Data sets may be organized into columns and rows (also referred to as records). The particular columns, rows, and organization of the columns and rows that make up a data set may be specified in the database statement requesting the data set. Data sets may be sent from the cloud-based data warehouse 192 in response to a database statement (also referred to as a query). Accordingly, data sets retrieved in response to a database statement may be referred to as query results.

The table manager 126 is hardware, software, or an aggregation of hardware and software configured to receive instructions in the form of state specifications from the client computing system 194, via the GUI 202. The table manager 126 is also configured to present workbooks in the GUI 202 response to the instructions, which may include generating database statements in response to manipulations of the GUI 202 described in the state specification.

The state specification is a collection of data describing inputs into the GUI 202. The state specification may include manipulations of GUI elements within the GUI 202 along with data entered into the GUI 202 by a user of the client computing system 194. Such manipulations and data may indicate requests for and manipulations of data sets. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data set. Such elements may include filters applied to the workbook, the hierarchical level of the workbook, joins performed within the workbook, exposable parameters in the workbook, and security for the workbook.

The table manager 126 may use the state specification as input to generate a database statement. This database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

The table manager 126 may use the database statement to fetch query results (i.e. a data set) from the database 204. The table manager 126 may then present the query results to a user via the GUI 202. The table manager 126 may further manage tables on the database 202 to which a user has made edits, such as adding new rows or editing existing rows. Further, the table manager 126 may add columns to new rows and create new tables on the database 202.

The table manager 126 may service requests in the state specification using workbooks local to the table manager 126. A workbook is a presentation of a data set in the GUI 202. Specifically, a workbook is metadata describing a particular organization and configuration of a data set for presentation via the GUI 202. A workbook may include multiple elements including a visualization and a spreadsheet structure. For example, a workbook may include a spreadsheet structure presenting data points from a data set and an accompanying visualization may present a graph of the data points. Such workbooks may be stored in the workbook repository 206.

Figure 3:
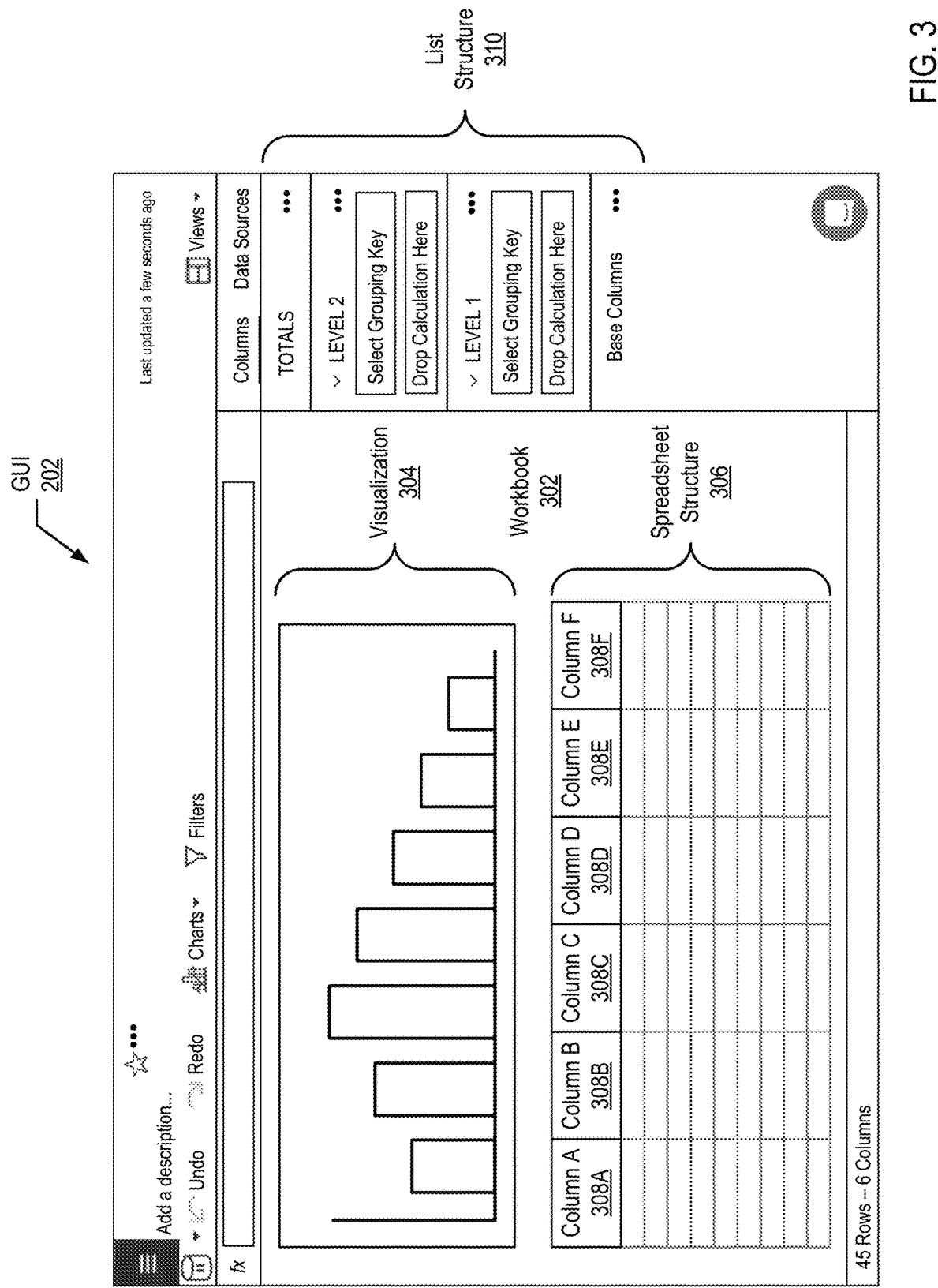
FIG. 3 sets forth a block diagram of an example system configured for live editing a workbook with multiple clients according to embodiments of the present invention.

FIG. 3 shows an exemplary system for live editing a workbook with multiple clients according to embodiments of the present invention. As shown in FIG. 3, the exemplary GUI 202 includes a workbook 302 and a list structure 310. The workbook 302 includes a visualization 304 and a spreadsheet structure 306 (shown as empty rows) with six columns (column A 308A, column B 308B, column C 308C, column D 308D, column E 308E, column F 308F).

The workbook 302 is a collection of graphical elements and organizing mechanism for a data set. As shown in FIG. 3, the workbook 302 includes a visualization 304 and a spreadsheet structure 306. The visualization 304 is a graphical element that conveys relationships between data in the data set. The visualization 304 may include, for example, graphs, charts, and/or maps. The spreadsheet structure 306 is a presentation of a data set (such as a table) from a database on a data warehouse. The spreadsheet structure 306 displays rows of data organized by columns (column A 308A, column B 308B, column C 308C, column D 308D, column E 308E, column F 308F). The columns delineate different categories of the data in each row. The columns may also be calculation columns that include calculation results using other columns in the spreadsheet structure 306. Both the visualization 304 and the spreadsheet structure 306 may include dynamic elements and be configured to interact with a client via the GUI 202.

The list structure 310 is a graphical element used to define and organize the hierarchical relationships between the columns (column A 308A, column B 308B, column C 308C, column D 308D, column E 308E, column F 308F) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure 310 presents a dimensional hierarchy to the user. Specifically, the list structure 310 presents levels arranged hierarchically across at least one dimension. Each level within the list structure 310 is a position within a hierarchical relationship between columns (column A 308A, column B 308B, column C 308C, column D 308D, column E 308E, column F 308F). The keys within the list structure 310 identify the one or more columns that are the participants in the hierarchical relationship. Each level may have more than one key.

One of the levels in the list structure 310 may be a base level. Columns selected for the base level provide data at the finest granularity. One of the levels in the list structure 310 may be a totals or root level. Columns selected for the totals level provide data at the highest granular level. For example, the totals level may include a field that calculates the sum of each row within a single column of the entire data set (i.e., not partitioned by any other column).

The GUI 202 may enable a user to drag and drop columns (column A 308A, column B 308B, column C 308C, column D 308D, column E 308E, column F 308F) into the list structure 310. The order of the list structure 310 may specify the hierarchy of the columns relative to one another. A user may be able to drag and drop the columns in the list structure 310 at any time to redefine the hierarchical relationship between columns. The hierarchical relationship defined using the columns selected as keys in the list structure 310 may be utilized in charts such that drilling down (e.g., double click on a bar), enables a new chart to be generated based on a level lower in the hierarchy.

The GUI 202 may also include a mechanism for a user to request a table from a database to be presented as a workbook in the GUI 202. Such a mechanism may be part of the interactivity of the workbook. Specifically, a user may manipulate a workbook (e.g., by dragging and dropping columns or rows, resorting columns or rows, manipulating a graph etc.) and, in response, the GUI 202 may generate a request (e.g., in the form of a state specification) for a data set and send the request to the table manager 126. Such a mechanism may also include a direct identification of the rows and columns of a database table that a user would like to access (e.g., via a selection of the rows and columns in a dialog box). The GUI 202 may also include a mechanism for a user to create a new table on the database, add rows to a table, and move rows within the table.

Figure 4:
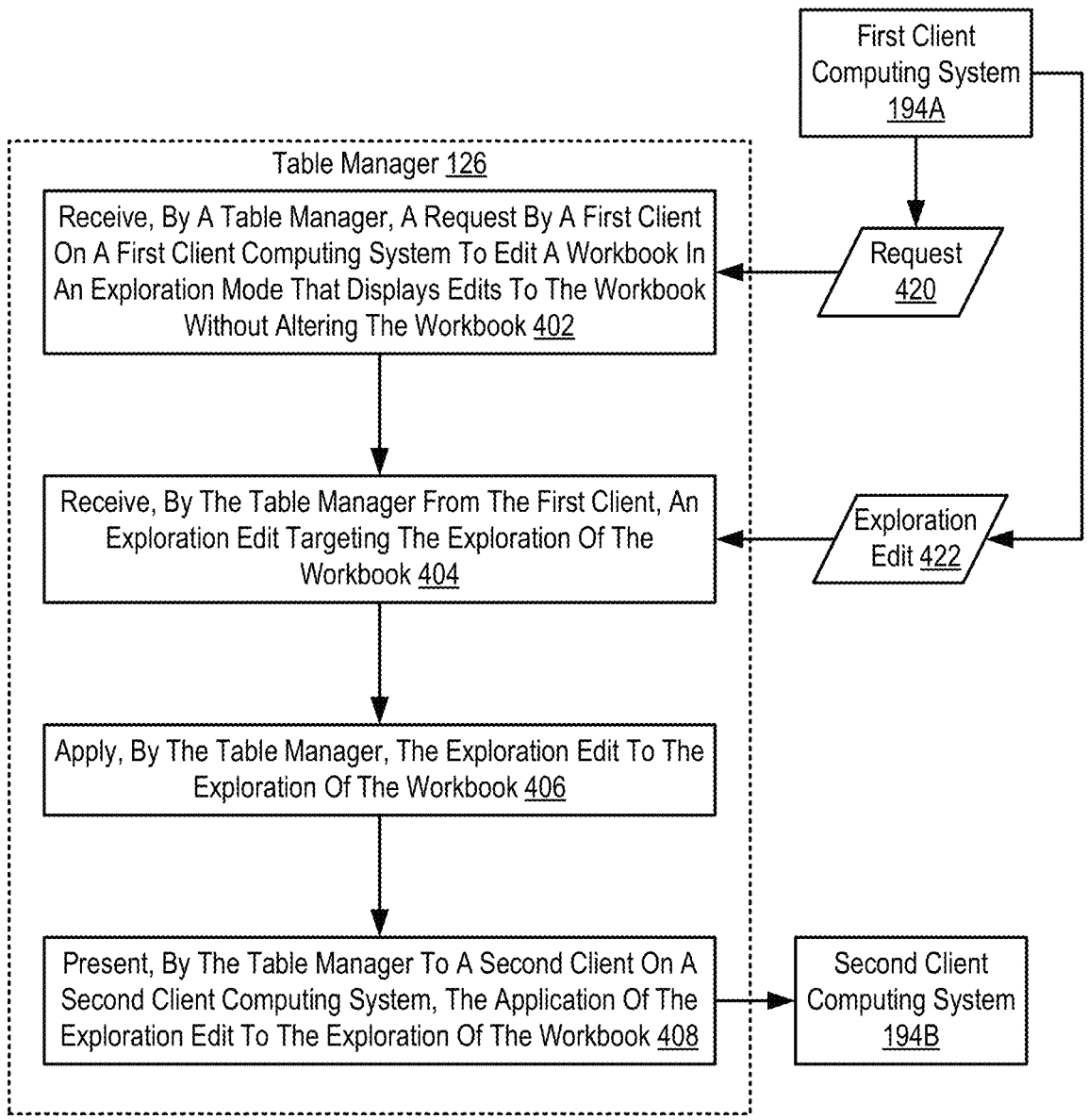
FIG. 4 sets forth a flow chart illustrating an exemplary method for live editing a workbook with multiple clients according to embodiments of the present invention.

For further explanation, FIG. 4 sets forth a flow chart illustrating an exemplary method for live editing a workbook with multiple clients according to embodiments of the present invention that includes receiving 402, by a table manager 126, a request 420 by a first client on a first client computing system 194A to edit a workbook in an exploration mode that displays edits to the workbook without altering the workbook. Receiving 402 the request to edit the workbook in the exploration mode may be carried out by detecting that the first client has manipulated elements of the GUI and/or submitted data using the GUI such that the generation of the request 420 is triggered, and the request 420 is sent to the table manager 126. The request 420 may be received in the form of a state specification from the GUI. Specifically, each change to the GUI may result in a new or updated state specification 420 that operates as an instruction to the table manager 126.

The workbook may present a data set retrieved by the table manager 126 from a cloud-based data warehouse. Specifically, the table manager 126 may generate a database statement in response to the request 420 from the first client. The database statement may then be issued to the cloud-based data warehouse and the data set may be received as the query results of the database statement. The data set may then be organized based on the workbook retrieved from the workbook repository. The table manager 126 itself may reside on an intermediary computing system between the first client computing system and the cloud-based data warehouse.

Editing a workbook in exploration mode (also referred to as editing an exploration of a workbook) is a mode of editing in which edits made to the workbook are displayed but no changes are made to the underlaying workbook (or the underlying data set). Rather, the edits made in the exploration of the workbook may be stored separately (e.g., as a bookmark). Another client accessing the underlying workbook would not be presented with the edits made to the exploration of the workbook. However, if the client requested a saved version (referred to as a bookmark) of the exploration of the workbook, the edits made in the exploration of the workbook would be presented. Bookmarks may be stored local to the table manager 126 in the workbook repository.

Editing an exploration of a workbook may be initiated for a variety of reasons. The first client may desire to temporarily reconfigure the workbook to study a relationship between data points in the data set not presented in the underlying workbook. Alternatively, the first client may not have access or permissions to edit the workbook itself. The first client may then configure the exploration of the workbook as necessary and save the reconfiguration as a bookmark that may be retrieved at a later time.

The method of FIG. 4 also includes receiving 404, by the table manager 126 from the first client, an exploration edit 422 targeting the exploration of the workbook. Receiving 404 the exploration edit 422 may be carried out by detecting that that the first client has submitted, via the GUI, a change to the exploration of the workbook. The exploration edit 422 may be received in a state specification. The exploration edit 422 is a change made to the exploration of the workbook (rather than the workbook itself or the underlying data set). The first client may submit the exploration edit 422 as though the edit were made to the workbook itself but for the first user having accessed the exploration of the workbook instead of the underlying workbook.

The method of FIG. 4 also includes applying 406, by the table manager 126, the exploration edit 422 to the exploration of the workbook. Applying 406 the exploration edit 422 to the exploration of the workbook may be carried out by creating a temporary workbook file (e.g., in volatile memory or the workbook repository). The new workbook file may utilize the underlying workbook as a data source such that any changes to the underlying workbook (or data set from the cloud-based data warehouse) would be propagated to the new workbook file when opened by a client (e.g., via a bookmark). Once the new workbook file is created, the table manager 126 may then change the new workbook file according to the exploration edit 422.

The exploration edit 422 may include modifications to the workbook visualization. The visualization may be modified to alter the relationships between data points presented in the visualization. For example, the exploration edit 422 may change the data sources for bars in a bar graph. The exploration edit 422 may also include modifications to the workbook spreadsheet structure. The spreadsheet structure may be modified to change the presentation of columns or rows, or may be modified to include an additional column, such as a calculation column. For example, the exploration edit 422 may add a column summing the values of two other columns in the spreadsheet structure.

The method of FIG. 4 also includes presenting 408, by the table manager 126 to a second client on a second client computing system 194B, the application of the exploration edit 422 to the exploration of the workbook. Presenting 408 the application of the exploration edit 422 to the second client may be carried out by detecting that the second client is currently viewing the same exploration of the workbook as the first client. Specifically, the second client may have received a notification that the first client had initiated an exploration of the workbook. Such a notification may have been part of a message sent from the first client to the second client. Alternatively, the second client may have been viewing the underlying workbook and been presented with a notification that the first client had initiated an exploration of the workbook.

Once the table manager 126 detects that the second client is currently viewing the exploration of the workbook and the exploration edit has been applied to the exploration of the workbook, the table manager 126 may then visually display the application of the exploration edit 422 to the second client. Presenting 408 the application of the exploration edit 422 to the second client may be performed contemporaneously with presenting, to the first client on the first client computing system, the application of the exploration edit 422 to the exploration of the workbook. Specifically, the second client and the first client may both be presented with the application of the exploration edit at substantially the same time (notwithstanding network responsiveness).

Presenting 408 the application of the exploration edit 422 to the second client may be carried out by presenting an animation of the change to the exploration of the workbook caused by the exploration edit 422. Specifically, the application of the exploration edit 422 may be visually depicted as an animation in which the previous state of the edited element of the exploration of the workbook is transitioned into the same element with the exploration edit 422 applied. For example, the animation may include a cross fade from the previous element into the edited element.

The above limitations improve the operation of the computer system by enabling two or more clients to view the same edits to a workbook without effecting any changes to the workbook. This is performed by a table manager presenting the workbook in an exploration mode and storing the edits made in the exploration of the workbook separate from the workbook. Subsequent changes to the underlying workbook and data set are also viewable in the exploration of the workbook.

Figure 5:
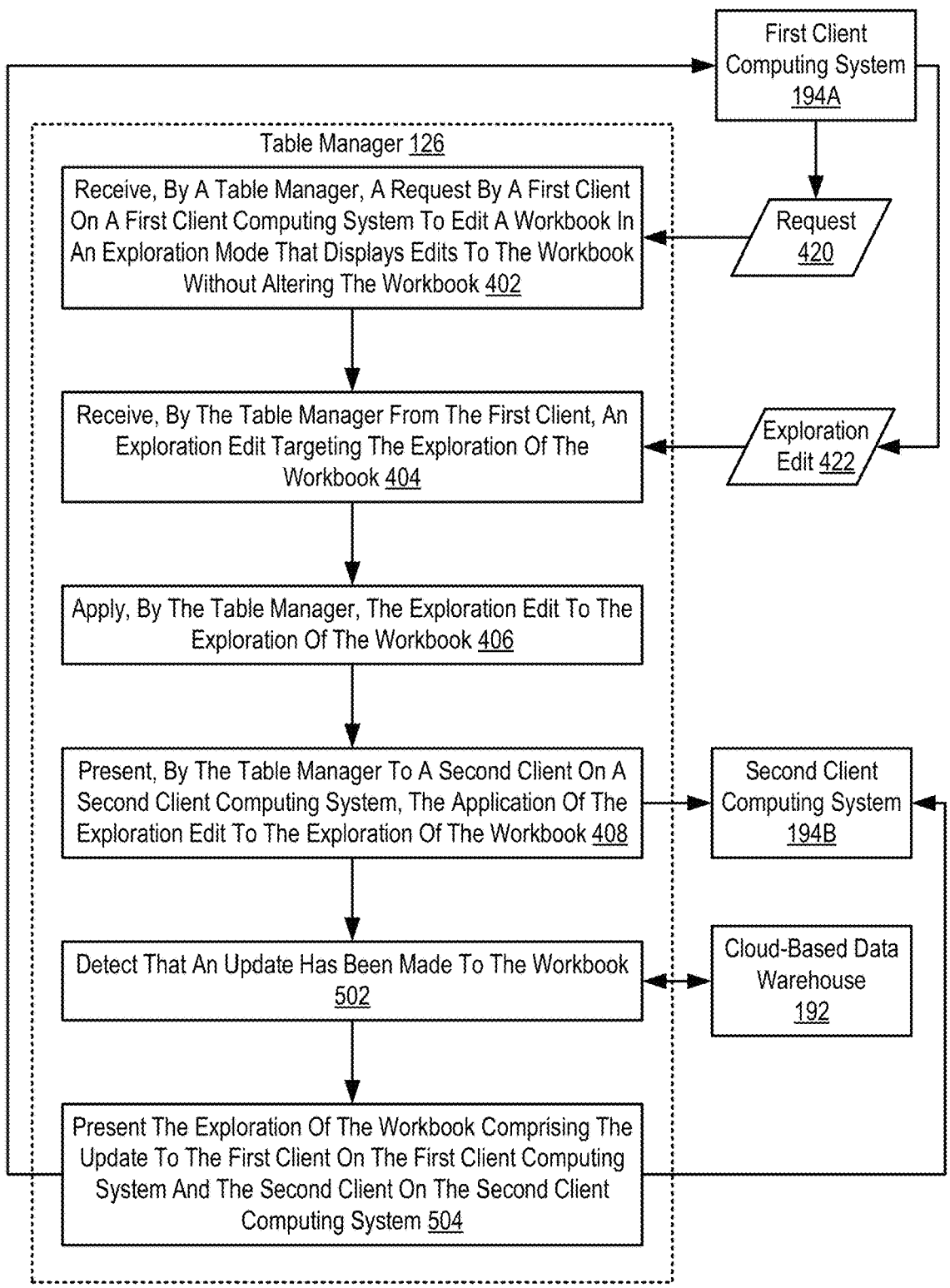
FIG. 5 sets forth a flow chart illustrating an exemplary method for live editing a workbook with multiple clients according to embodiments of the present invention.

For further explanation, FIG. 5 sets forth a flow chart illustrating a further exemplary method for live editing a workbook with multiple clients according to embodiments of the present invention that includes receiving 402, by a table manager126, a request 420 by a first client on a first client computing system 194A to edit a workbook in an exploration mode that displays edits to the workbook without altering the workbook; receiving 404, by the table manager 126 from the first client, an exploration edit 422 targeting the exploration of the workbook; applying 406, by the table manager 126, the exploration edit 422 to the exploration of the workbook; and presenting 408, by the table manager 126 to a second client on a second client computing system 194B, the application of the exploration edit 422 to the exploration of the workbook.

The method of FIG. 5 differs from the method of FIG. 4, however, in that FIG. 5 further includes detecting 502 that an update has been made to the workbook; and presenting 504 the exploration of the workbook comprising the update to the first client on the first client computing system and the second client on the second client computing system.

Detecting 502 that the update has been made to the workbook may be carried out by the table manager 126 receiving a notification that a change to the workbook (or data set) has been made. The update may be made by a different (third) user with permission to edit the workbook. Detecting 502 that the update has been made to the workbook may occur in response to the table manager 126 retrieving the bookmark and workbook metadata for presentation of the exploration of the workbook to the first and second client.

Presenting 504 the exploration of the workbook comprising the update to the first client and the second client may be carried out by refreshing the version of the workbook presented in the exploration of the workbook to include the update. Specifically, the table manager 126 may access the workbook repository to retrieve the latest version of the workbook metadata that includes the update. The table manager 126 may then integrate the latest version of the workbook with the edits made within the exploration of the workbook and present the updated exploration of the workbook to all clients currently viewing the exploration of the workbook.

Figure 6:
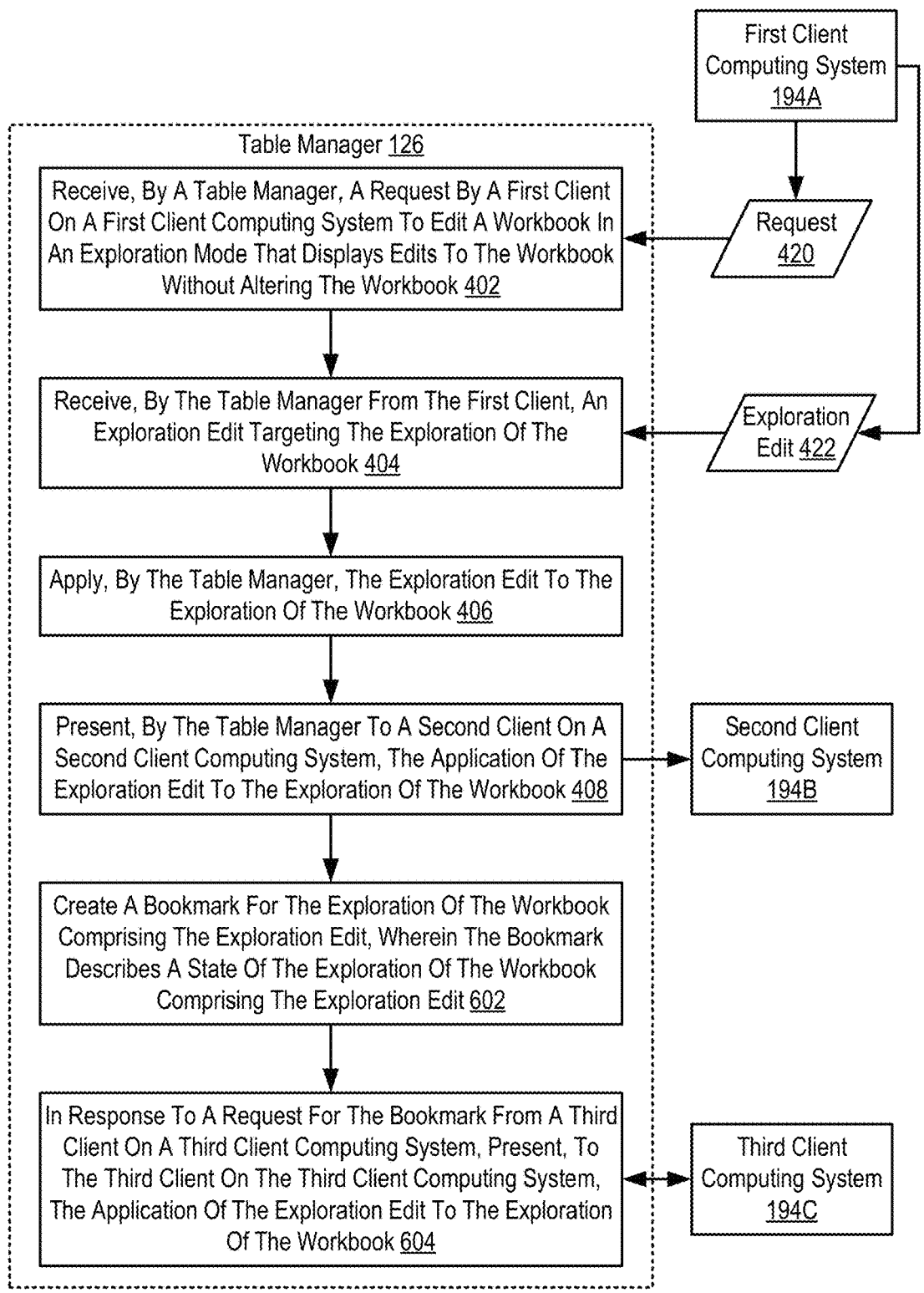
FIG. 6 sets forth a flow chart illustrating an exemplary method for live editing a workbook with multiple clients according to embodiments of the present invention.

For further explanation, FIG. 6 sets forth a flow chart illustrating a further exemplary method for live editing a workbook with multiple clients according to embodiments of the present invention that includes receiving 402, by a table manager126, a request 420 by a first client on a first client computing system 194A to edit a workbook in an exploration mode that displays edits to the workbook without altering the workbook; receiving 404, by the table manager 126 from the first client, an exploration edit 422 targeting the exploration of the workbook; applying 406, by the table manager 126, the exploration edit 422 to the exploration of the workbook; and presenting 408, by the table manager 126 to a second client on a second client computing system 194B, the application of the exploration edit 422 to the exploration of the workbook.

The method of FIG. 6 differs from the method of FIG. 4, however, in that FIG. 5 further includes creating 602 a bookmark for the exploration of the workbook comprising the exploration edit 422, wherein the bookmark describes a state of exploration of the workbook comprising the exploration edit 422; and in response to a request for the bookmark from a third client on a third client computing system, presenting 604, to the third client on the third client computing system 194C, the application of the exploration edit 422 to the exploration of the workbook.

Creating 602 the bookmark for the exploration of the workbook may be carried out by storing elements of the exploration of the workbook presented in the GUI in the workbook repository (or other bookmark repository). The bookmark stores the state of the exploration of the workbook at the time of the creation of the bookmark. The bookmark may store the differences between the workbook and the current state of the exploration of the workbook. For example, if a new calculation column has been created in the exploration of the workbook, then information about the calculation column and the identity of the underlying workbook may be stored in the bookmark.

Presenting 604, to the third client on the third client computing system 194C, the application of the exploration edit 422 to the third client may be carried out by visually displaying the application of the exploration edit 422 to the third client. The application of the exploration edit 422 is presented in response to a request for the bookmark from the third client. Specifically, the third client may retrieve the bookmark from the workbook repository (or other bookmark repository) for presentation on the GUI of the third computing system. The presentation of the application of the exploration edit 422 may be part of a playback function that visually presents edits made in the exploration of the workbook chronologically.

Figure 7:
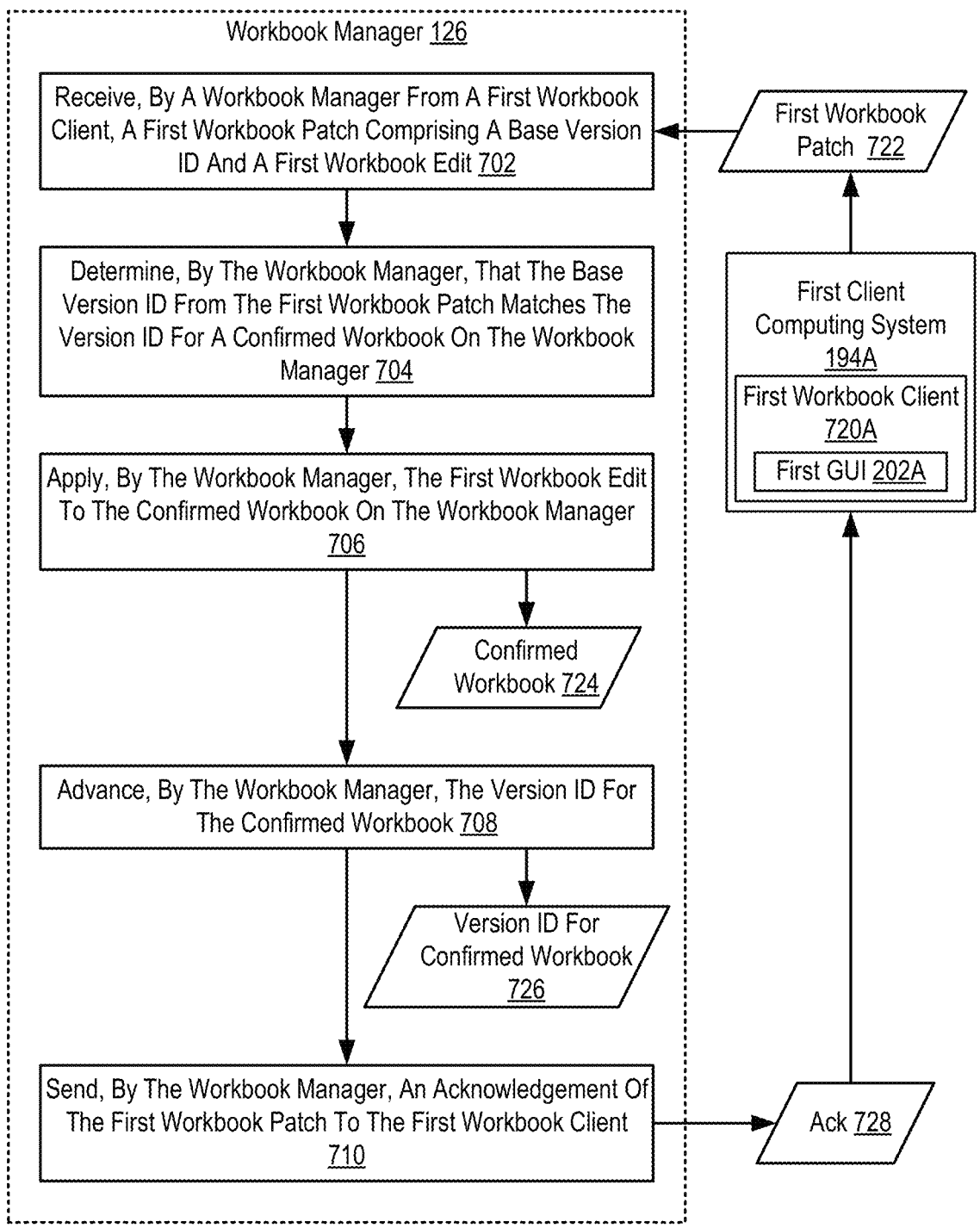
FIG. 7 sets forth a flow chart illustrating an exemplary method for live editing a workbook with multiple clients according to embodiments of the present invention.

For further explanation, FIG. 7 sets forth a flow chart illustrating an exemplary method for resolving live edit conflicts according to embodiments of the present invention. The workbook manager 126 in FIG. 7 may be functionally similar to the table manager described above. Specifically, the workbook manager 126 may be hardware, software, or an aggregation of hardware and software configured to receive instructions in the form of state specifications from a client computing system, via a GUI. The workbook manager 126 may also be configured to present workbooks in the GUI response to the instructions, which may include generating database statements in response to manipulations of the GUI described in the state specification.

The workbook manager 126 operates in conjunction with a workbook client (e.g., the first workbook client 720A) on the client computing system. Specifically, each workbook client is a portion of the workbook manager 126 executing on a client computing system and configured to present (via the GUI) a workbook to a client using the client computing system. When viewing or editing a workbook, each workbook client stores and maintains a copy of the workbook. In addition, the workbook manager 126 stores and maintains a confirmed workbook 724, which is the source-of-truth version of the workbook. Any edit to the workbook is not saved by the workbook manager unless that edit is made to the confirmed workbook. Additionally, only changes made to the confirmed workbook 724 are propagated out to the other workbook clients. As discussed above, each workbook may be populated by data from the cloud-based data warehouse.

When making an edit to the workbook, each workbook client optimistically applies the edit to the version of the workbook stored on the workbook client. The workbook client then generates a workbook patch to send to the workbook manager 126. The workbook patch includes the workbook edit and the base version ID. The workbook patch may also include a proposed version ID. If the workbook patch is accepted by the workbook manager 126, the edit is made to the confirmed workbook 724, an acknowledgement 728 is sent to the workbook client, and the workbook patch is propagated to each other workbook client currently presenting the workbook on a client computing system. If the workbook patch is not accepted by the workbook manager 126 a rejection is sent to the workbook client.

The method of FIG. 7 includes receiving 702, by a workbook manager 126 from a first workbook client 720A, a first workbook patch 722 comprising a base version ID and a first workbook edit. Receiving 702 a first workbook patch 722 that includes a base version ID and a first workbook edit may be carried out by the first workbook client 720A detecting that an edit has been made to the version of the workbook presented via the first GUI 202A on the first client computing system 194A. Upon detecting the edit, the first workbook client 720A generates the first workbook patch 722 that includes the workbook edit and the version ID of the workbook on the first workbook client 720A.

The first workbook patch 722 is a message that the first workbook client 720A uses to communicate a workbook edit to the workbook manager 126 and attempt to have the workbook edit accepted by the workbook manager 126 and propagated to the other workbook clients currently viewing the workbook. Prior to, or contemporaneously with, generating and sending the first workbook patch 722, the first workbook client 720A may optimistically apply the workbook edit to the version of the workbook hosted by the first workbook client 720A. The workbook edit is applied optimistically under the assumption that the workbook manager 126 will accept the workbook edit. The first workbook patch 722 may be in the form of a state specification.

The first workbook patch 722 includes the workbook edit and the base version ID of the workbook on the first workbook client720A. The workbook edit is a modification applied to the workbook. The workbook edit may be a modification to the workbook itself rather than the underlying data from the cloud-based data warehouse. The workbook edit may be a modification to the visualization or spreadsheet structure of the workbook. Examples of workbook edits made to the visualization of a workbook include modifications to the size or shape of one or more graphic elements within the visualization, modifications to the labels of the visualization, and modifications to the order of graphic elements within the visualization. Examples of workbook edits made to the spreadsheet structure of a workbook include modifications to the size of one or more columns within the spreadsheet structure, modifications to the labels of columns within the spreadsheet structure, and filters applied to the rows within the spreadsheet structure.

For example, a first client using the first client computing system 194A may change the name of a column within a spreadsheet structure of the workbook on the first workbook client 720A. The first workbook client 720A may then generate the first workbook patch 722 that includes the edited name of the column as the workbook edit and the base version ID of the workbook on the first workbook client 720A to which the edit was applied. The first workbook patch 722 may then be transmitted to the workbook manager 126. As discussed above, the column name is changed on the first workbook client 720A before the workbook manager 126 receives the first workbook patch 722.

The base version ID of the workbook on the first workbook client 720A is an identifier of the state of the workbook on the first workbook client 720A. The base version ID is used to compare, to the confirmed workbook, the version of the workbook to which the workbook edit is being applied.

The base version ID may be a value comparable to another version ID value to determine the more recent version ID. The base version ID may be, for example, an alphanumeric code that, when compared to another version ID, indicates which version ID refers to a more recently edited workbook. Alternatively, the base version ID may be a value unique to all other version IDs and have no discernable relationship to any other version ID. Specifically, the version IDs may simply uniquely identify a version of workbook, distinguishing the version of the workbook from all other versions of the workbook without indicating which is newer. A comparison of such version IDs may only result in determining whether they are identical (i.e., not which is newer). The base version ID and/or the first workbook patch 722 may also lack a timestamp.

The first workbook patch 722 may also include a proposed version ID. The proposed version ID is a value to identify the workbook after the associated workbook edit is applied. As discussed above, the proposed version ID may have a relationship with the base version ID such that a comparison of the two would indicate that the proposer version ID is newer. Alternatively, the proposed version ID may merely be a unique value with no such relationship to the base version ID.

The version ID for any workbook version may include additional information about the version of the workbook. Such additional information may include, for example, an identifier of the source of the most recent edit (e.g. "XXX-first workbook client"), an indicator of the type of edit made (e.g. "XXX-filter applied"), or an indicator of the target element to which the edit was applied (e.g. "XXX-visualization A").

The method of FIG. 7 also includes determining 704, by the workbook manager 126, that the base version ID from the first workbook patch 722 matches the version ID for a confirmed workbook 724 on the workbook manager 126. Determining 704 that the base version ID from the first workbook patch 722 matches the version ID for a confirmed workbook 724 on the workbook manager 126 may be carried out by comparing the base version ID from the first workbook patch 722 to the version ID for the confirmed workbook 724 on the workbook manager 126. For example, if base version ID from the first workbook patch 722 is "LION" and the version ID for the confirmed workbook 724 on the workbook manager 126 is "TIGER", the workbook manger 126 would determine that the base version ID from the first workbook patch 722 does not match the version ID for the confirmed workbook 724 on the workbook manager 126. However, if base version ID from the first workbook patch 722 is "LION" and the version ID for the confirmed workbook 724 on the workbook manager 126 is also "LION", the workbook manger 126 would determine that the base version ID from the first workbook patch 722 matches the version ID for the confirmed workbook 724 on the workbook manager 126.

The method of FIG. 7 also includes applying 706, by the workbook manager 126, the first workbook edit to the confirmed workbook 724 on the workbook manager 126. Applying 706 the first workbook edit to the confirmed workbook 724 may be carried out by replaying the workbook edit from the first workbook patch 722 on the confirmed workbook 724. As discussed above, the confirmed workbook 724 is the version of the workbook that is saved and provided to workbook clients requesting the workbook. Only changes made to the confirmed workbook 724 are propagated out to the other workbook clients.

For example, assume that the first workbook patch 722 includes a workbook edit that changes the calculation of a column from "10% of X" to "20% of X". The workbook edit may include the new calculation for the column and an identifier of the target column. Upon determining that the base version ID from the first workbook patch 722 matches the version ID for a confirmed workbook 724, the workbook manager 126 would replace the calculation of "10% of X" with the calculation "20% of X".

The method of FIG. 7 also includes advancing 708, by the workbook manager 126, the version ID for the confirmed workbook 726. Advancing 708 the version ID for the confirmed workbook 726 may be carried out by incrementing the version ID for the confirmed workbook to indicate a more recent version of the confirmed workbook than identified by the previous version ID. For example, the workbook manager 126 may advance the version ID for the confirmed workbook 726 from "version A" to "version B".

In a system in which a proposed version ID is included in the first workbook patch 722, advancing 708 the version ID for the confirmed workbook 726 may be carried out by replacing the version ID for the confirmed workbook 726 with the proposed version ID from the first workbook patch 722. For example, the workbook manager may replace with current version ID for the confirmed workbook 726, "TIGER", with the proposed version ID from the first workbook patch 722, "LION".

The method of FIG. 7 also includes sending 710, by the workbook manager 126, an acknowledgement 728 of the first workbook patch 722 to the first workbook client 720A. Sending 710 an acknowledgement 728 of the first workbook patch 722 to the first workbook client 720A may be carried out by generating the acknowledgement 728 and transmitting the acknowledgement 728 to the source of the first workbook patch 722. The acknowledgement 728 may include a message indicating that the workbook edit in the first workbook patch 722 was accepted and that the current version of the confirmed workbook 724 includes the workbook edit. The acknowledgement 728 may also include other information, such as the current version ID of the confirmed workbook (which may be the proposed version ID).

The above-identified steps improve the operation a computer system by offloading conflict resolution for multiple entities editing the same workbook from the workbook manager to the entities editing the workbook. The workbook manager accepts or rejects edits made to the workbook based on the version ID received with the edit. Edits not accepted are retried or abandoned by the entity that made the edit. Offloading conflict resolution improves the robustness of the system.

Figure 8:
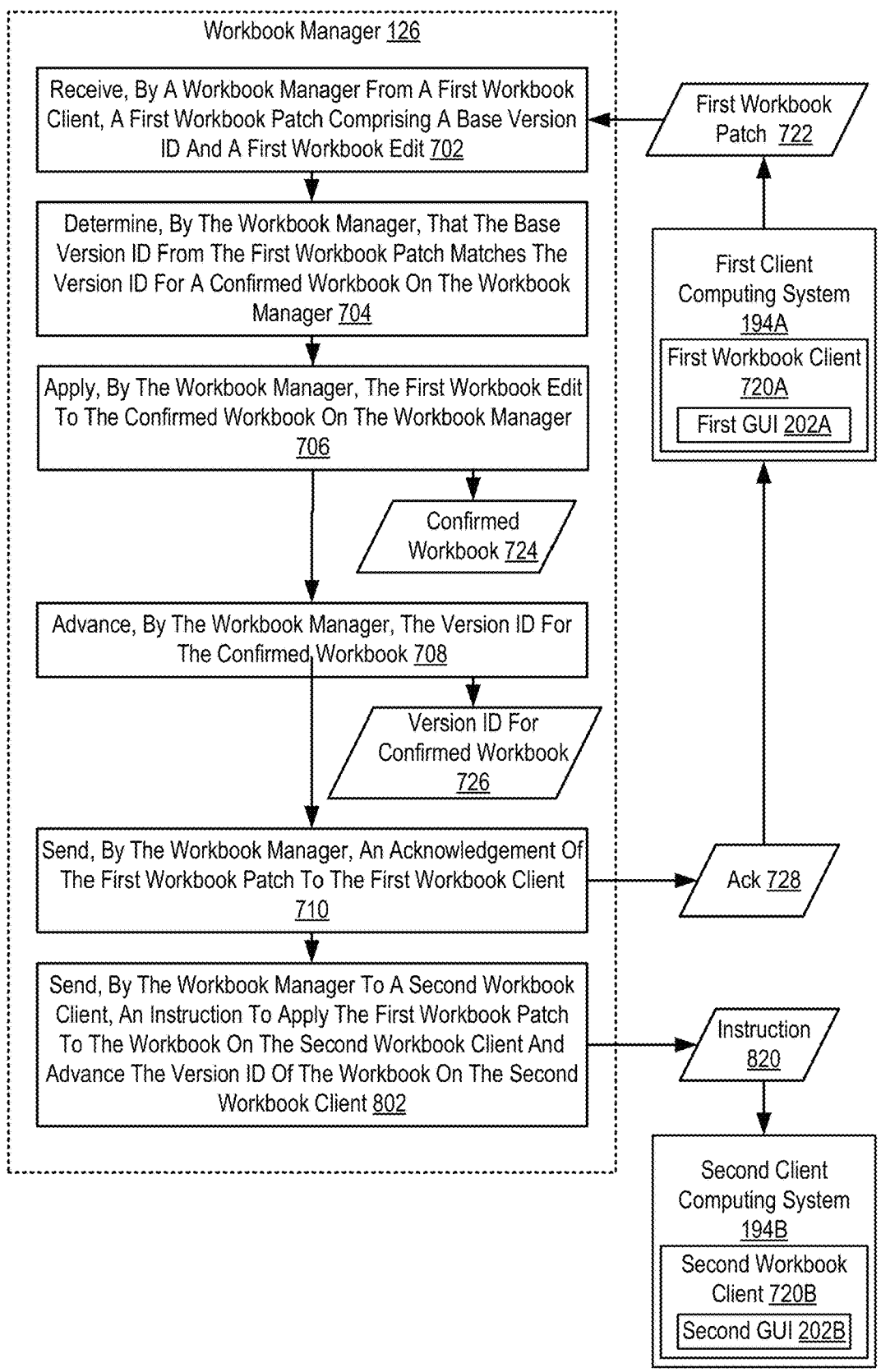
FIG. 8 sets forth a flow chart illustrating an exemplary method for live editing a workbook with multiple clients according to embodiments of the present invention.

For further explanation, FIG. 8 sets forth a flow chart illustrating a further exemplary method for resolving live edit conflicts according to embodiments of the present invention that includes receiving 702, by a workbook manager 126 from a first workbook client 720A, a first workbook patch 722 comprising a base version ID and a first workbook edit; determining 704, by the workbook manager 126, that the base version ID from the first workbook patch 722 matches the version ID for a confirmed workbook 724 on the workbook manager 126; applying 706, by the workbook manager 126, the first workbook edit to the confirmed workbook 724 on the workbook manager 126; advancing 708, by the workbook manager 126, the version ID for the confirmed workbook 726; and sending 710, by the workbook manager 126, an acknowledgement 728 of the first workbook patch 722 to the first workbook client 720A.

The method of FIG. 8 differs from the method of FIG. 7, however, in that FIG. 8 further includes sending, by the workbook manager 126 to a second workbook client 720B, an instruction 820 to apply the first workbook patch 722 to the workbook on the second workbook client 720B and advance the version ID of the workbook on the second workbook client 720B. Contemporaneously with the acknowledgement 728, the workbook manager 126 may send the instruction 820 that includes the first workbook patch 722. The second workbook client 720 then applies the workbook edit from the first workbook patch 722 to the version of the workbook on the second workbook client 720B and advances the version ID of the workbook on the second workbook client 720B. If the instruction 820 includes a proposed version ID from the first workbook patch 722, the second workbook client 720 would then replace the version ID of the workbook on the second workbook client 720B with the proposed version ID from the first workbook patch 722.

Figure 9:
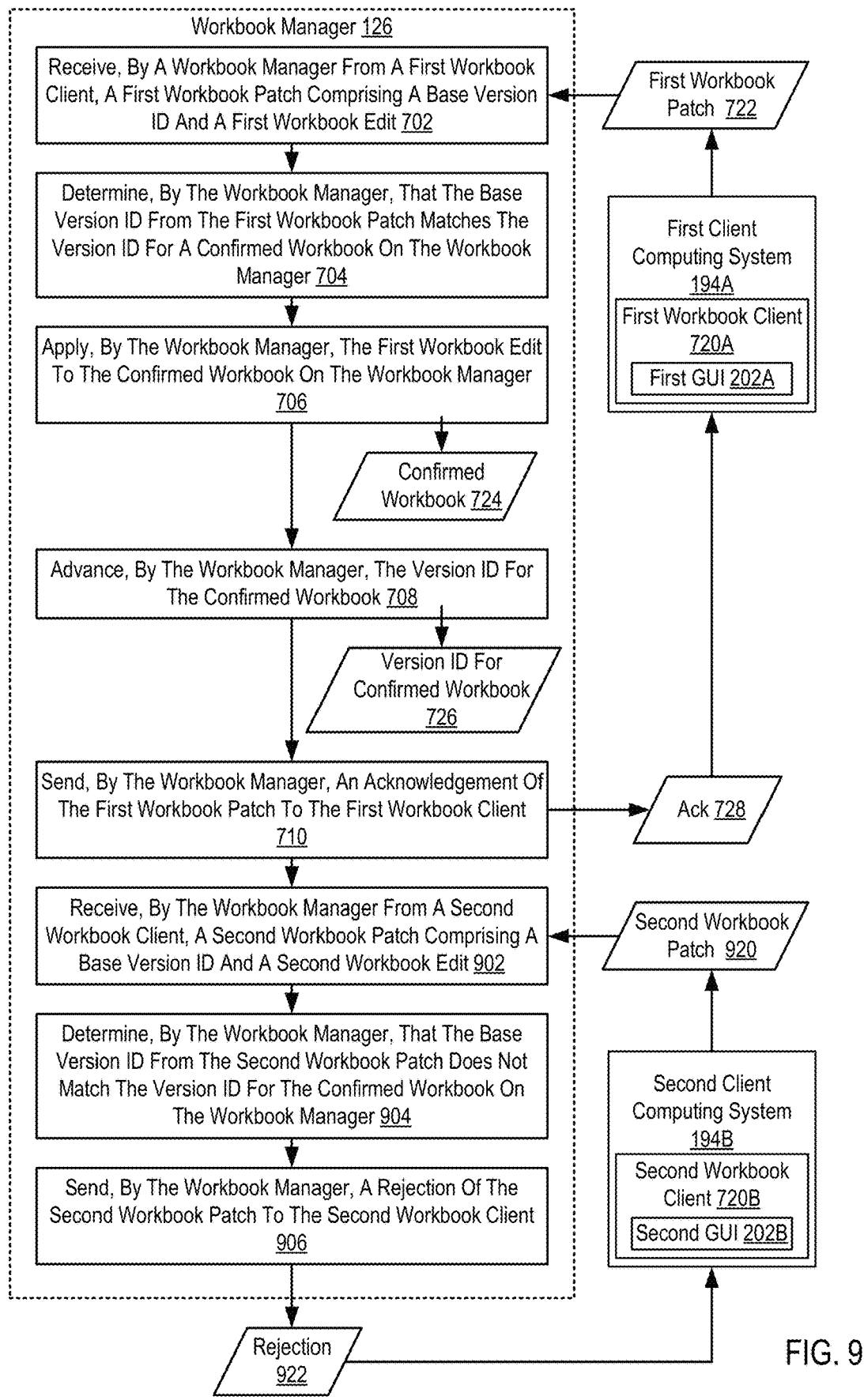
FIG. 9 sets forth a flow chart illustrating an exemplary method for live editing a workbook with multiple clients according to embodiments of the present invention.

For further explanation, FIG. 9 sets forth a flow chart illustrating a further exemplary method for resolving live edit conflicts according to embodiments of the present invention that includes receiving 702, by a workbook manager 126 from a first workbook client 720A, a first workbook patch 722 comprising a base version ID and a first workbook edit; determining 704, by the workbook manager 126, that the base version ID from the first workbook patch 722 matches the version ID for a confirmed workbook 724 on the workbook manager 126; applying 706, by the workbook manager 126, the first workbook edit to the confirmed workbook 724 on the workbook manager 126; advancing 708, by the workbook manager 126, the version ID for the confirmed workbook 726; and sending 710, by the workbook manager 126, an acknowledgement 728 of the first workbook patch 722 to the first workbook client 720A.

The method of FIG. 9 differs from the method of FIG. 7, however, in that FIG. 9 further includes receiving 902, by the workbook manager 126 from a second workbook client 720B, a second workbook patch 920 comprising a base version ID and a second workbook edit; determining 904, by the workbook manager 126, that the base version ID from the second workbook patch 920 does not match the version ID for the confirmed workbook 726 on the workbook manager 126; and sending 906, by the workbook manager 126, a rejection 922 of the second workbook patch 920 to the second workbook client 720B.

In the example of FIG. 9, the second workbook client 720B sends the second workbook patch 920 before having received the instruction to apply the first workbook patch 722 to the workbook on the second workbook client 720B. The second workbook client 720B, therefore, is attempting to edit the same version of the workbook that has already been edit by the first workbook client 720A.

Receiving 902 a second workbook patch 920 comprising a base version ID and a second workbook edit may be carried out by the second workbook client 720B detecting that an edit has been made to the version of the workbook presented via the second GUI 202B on the second client computing system 194B. Upon detecting the edit, the second workbook client 720B generates the second workbook patch 920 that includes the workbook edit and the version ID of the workbook on the second workbook client 720B.

Determining 904 that the base version ID from the second workbook patch 920 does not match the version ID for the confirmed workbook 726 may be carried out by comparing the base version ID from the second workbook patch 920 to the version ID for the confirmed workbook 724 on the workbook manager 126 and determining the two version IDs are not the same.

Sending 906 a rejection 922 of the second workbook patch 920 to the second workbook client 720B may be carried out by generating the rejection 922 and transmitting the rejection 922 to the source of the first workbook patch 722. The rejection 922 may include a message indicating that the workbook edit in the second workbook patch 920 was not accepted and that the current version of the confirmed workbook 724 has changed. The acknowledgement 728 may also include other information, such as the current version ID of the confirmed workbook or the first workbook patch 722.

Because the second workbook client 720B may have already optimistically applied the workbook edit from the second workbook patch 920 to the version of the workbook on the second workbook client 720B before sending the second workbook patch 920 to the workbook manager 126. Consequently, once the rejection 922 is received, the second workbook client 720B must reintegrate the workbook edits to match the confirmed workbook. This may include reverting to the previous (i.e., before the workbook edit from the second workbook patch 920 was applied) version of the workbook, applying the workbook edit from the first workbook patch 722 to that version of the workbook, then attempting to apply the new workbook edit from the second workbook patch 920 to the updated version of the workbook. If the new workbook edit from the second workbook patch 920 is able to be applied to the updated version of the workbook, the second workbook client 720B may then send the second workbook patch 920 to the workbook manager 126 with the new base version ID (i.e., the base version ID from the first workbook patch 722). If the new workbook edit from the second workbook patch 920 is not able to be applied to the updated version of the workbook, then an error may be presented.

In view of the explanations set forth above, readers will recognize that the benefits of live editing a workbook with multiple clients according to embodiments of the present invention include:
  Improving the operation of the computer system by enabling two or more clients to edit the same workbook, increasing system functionality.
  Improving the operation of the computer system by offloading conflict resolution for multiple entities editing the same workbook from the workbook manager to the entities editing the workbook, increasing system robustness.

Exemplary embodiments of the present invention are described largely in the context of a fully functional computer system for live editing a workbook with multiple clients. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for live editing a workbook with multiple clients, the method comprising:

receiving, by a workbook manager from a first workbook client, a first workbook patch comprising a base version ID, a proposed version ID, and a first workbook edit;

determining, by the workbook manager, that the base version ID from the first workbook patch matches a version ID for a confirmed workbook on the workbook manager;

applying, by the workbook manager, the first workbook edit to the confirmed workbook on the workbook manager;

advancing, by the workbook manager, the version ID for the confirmed workbook to the proposed version ID from the first workbook patch; and sending, by the workbook manager, an acknowledgement of the first workbook patch to the first workbook client.

2. The method of claim 1, further comprising:

receiving, by the workbook manager from a second workbook client, a second workbook patch comprising a base version ID and a second workbook edit;

determining, by the workbook manager, that the base version ID from the second workbook patch does not match the version ID for the confirmed workbook on the workbook manager; and sending, by the workbook manager, a rejection of the second workbook patch to the second workbook client.

3. The method of claim 1, further comprising:

sending, by the workbook manager to a second workbook client, an instruction to apply the first workbook patch to the workbook on the second workbook client and advance the version ID of the workbook on the second workbook client.

4. The method of claim 1, wherein the workbook manager receives the first workbook patch after the first workbook patch is applied to the workbook on first workbook client.

5. The method of claim 1, wherein the first workbook client is on a first workbook client computing system.

6. The method of claim 1, wherein the first workbook edit modifies a visualization of the workbook.

7. The method of claim 1, wherein the first workbook edit modifies a spreadsheet structure of the workbook.

8. The method of claim 1, wherein the confirmed workbook is populated with data from a cloud-based data warehouse.

9. The method of claim 1, wherein the workbook manager is on an intermediary computing system.

10. An apparatus for live editing a workbook with multiple clients, the apparatus comprising a computer processor, a computer memory operatively coupled to the computer processor, the computer memory having disposed within it computer program instructions that, when executed by the computer processor, cause the apparatus to carry out the steps of:

receiving, by a workbook manager from a first workbook client, a first workbook patch comprising a base version ID, a proposed version ID, and a first workbook edit;

determining, by the workbook manager, that the base version ID from the first workbook patch matches a version ID for a confirmed workbook on the workbook manager;

applying, by the workbook manager, the first workbook edit to the confirmed workbook on the workbook manager;

advancing, by the workbook manager, the version ID for the confirmed workbook to the proposed version ID from the first workbook patch; and sending, by the workbook manager, an acknowledgement of the first workbook patch to the first workbook client.

11. The apparatus of claim 10, wherein the computer program instructions further cause the apparatus to carry out the steps of:

receiving, by the workbook manager from a second workbook client, a second workbook patch comprising a base version ID and a second workbook edit;

determining, by the workbook manager, that the base version ID from the second workbook patch does not match the version ID for the confirmed workbook on the workbook manager; and sending, by the workbook manager, a rejection of the second workbook patch to the second workbook client.

12. The apparatus of claim 10, wherein the computer program instructions further cause the apparatus to carry out the steps of:

sending, by the workbook manager to a second workbook client, an instruction to apply the first workbook patch to the workbook on the second workbook client and advance the version ID of the workbook on the second workbook client.

13. The apparatus of claim 10, wherein the workbook manager receives the first workbook patch after the first workbook patch is applied to the workbook on first workbook client.

14. The apparatus of claim 10, wherein the first workbook client is on a first workbook client computing system.

15. The apparatus of claim 10, wherein the first workbook edit modifies a visualization of the workbook.

16. The apparatus of claim 10, wherein the first workbook edit modifies a spreadsheet structure of the workbook.

17. The apparatus of claim 10, wherein the confirmed workbook is populated with data from a cloud-based data warehouse.

18. A computer program product for live editing a workbook with multiple clients, the computer program product disposed upon a non-transitory computer readable medium, the computer program product comprising computer program instructions that, when executed, cause a computer to carry out the steps of:

receiving, by a workbook manager from a first workbook client, a first workbook patch comprising a base version ID, a proposed version ID, and a first workbook edit;

determining, by the workbook manager, that the base version ID from the first workbook patch matches a version ID for a confirmed workbook on the workbook manager;

applying, by the workbook manager, the first workbook edit to the confirmed workbook on the workbook manager;

advancing, by the workbook manager, the version ID for the confirmed workbook to the proposed version ID from the first workbook patch; and sending, by the workbook manager, an acknowledgement of the first workbook patch to the first workbook client.

* * * * *